United States Patent [19]

Shingaki et al.

[11] Patent Number: 5,032,000
[45] Date of Patent: Jul. 16, 1991

[54] GRADIENT INDEX-TYPE OPTICAL DEVICE AND PROCESS FOR PRODUCTION THEREOF

[75] Inventors: Seiichi Shingaki, Atsugi; Kohei Nakata, Yokohama; Takashi Serizawa, Atsugi; Kazuyoshi Nagao, Yokohama; Haruo Tomono, Kawasaki, all of Japan

[73] Assignee: Canon Kabushiki Kaisha, Japan

[21] Appl. No.: 301,880

[22] Filed: Jan. 26, 1989

[30] Foreign Application Priority Data

Jan. 29, 1988 [JP] Japan .................. 63-18813

[51] Int. Cl.⁵ .................................. G02B 6/18
[52] U.S. Cl. ........................ 350/96.31; 350/96.34
[58] Field of Search ........... 350/96.29, 96.30, 96.31, 350/96.34, 96.18, 413

[56] References Cited

U.S. PATENT DOCUMENTS

| | | | |
|---|---|---|---|
| 3,859,103 | 1/1975 | Yoshiyagawa et al. | 350/96.34 X |
| 3,922,062 | 11/1975 | Uchida | 350/96.12 |
| 3,923,486 | 12/1975 | Kitano et al. | 350/96.34 X |
| 3,938,974 | 2/1976 | Macedo et al. | 350/96.3 X |
| 4,744,620 | 5/1988 | Ueno et al. | 350/96.18 |
| 4,766,954 | 8/1988 | Bierlein et al. | 156/624 |
| 4,778,256 | 10/1988 | Serizawa | 350/320 |
| 4,798,694 | 1/1989 | Sugata et al. | 264/60 |
| 4,971,423 | 11/1990 | Nakata et al. | 350/96.31 |

FOREIGN PATENT DOCUMENTS 63-190732 8/1988 Japan .
1113229 5/1968 United Kingdom .

*Primary Examiner*—Frank Gonzalez
*Attorney, Agent, or Firm*—Fitzpatrick, Cella, Harper & Scinto

[57] ABSTRACT

A gradient index-type optical device produced by the ion exchange process, comprising: a transparent dielectric body having a refractive index distribution, and a refractive index distribution-adjusting portion disposed on at least a part of the transparent dielectric body. Because of the presence of the refractive-index distribution, the ion-exchange speed therethrough is controlled to provide a controlled refractive index distribution in the transparent dielectric body. As a result, a gradient index-type optical device having a large refractive index factor (g value) without substantial increase in aberration.

5 Claims, 5 Drawing Sheets

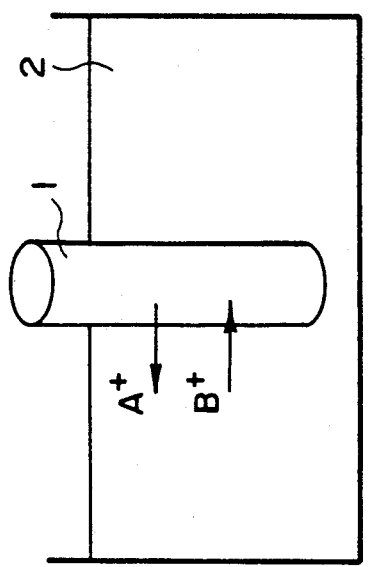
FIG. 11
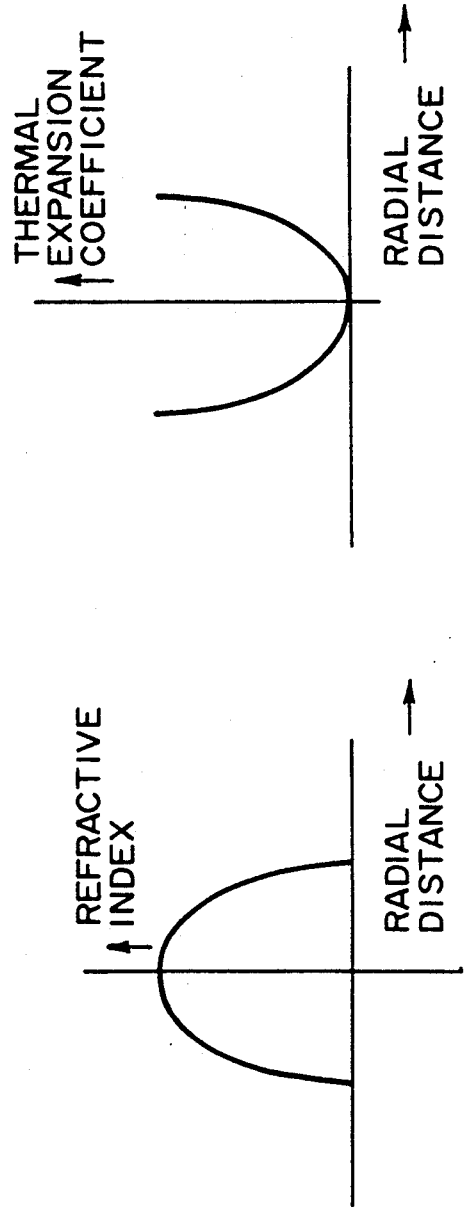
FIG. 12
FIG. 13

GRADIENT INDEX-TYPE OPTICAL DEVICE AND PROCESS FOR PRODUCTION THEREOF

FIELD OF THE INVENTION AND RELATED ART

The present invention relates to a gradient index-type optical device and a process for production thereof based on an ion exchange process wherein a transparent dielectric body is soaked in or caused to contact a molten salt containing an ion providing a gradient index or refractive index gradient to cause exchange between the ion in the molten salt and an ion in the transparent dielectric body thereby to form a gradient index in the transparent dielectric body.

There has been known an ion exchange process as described above for producing a gradient index-type optical device. For example, as shown in FIG. 11, a glass rod 1 containing a cation denoted by $A^+$ such as $Li^+$, $Tl^+$ or $Cs^+$ is soaked in a molten salt 2 such as sodium nitrate or potassium nitrate, so that the ion ($A^+$) in the glass is exchange with the cation ($B^+$) in the molten salt to obtain a rod lens having a refractive index distribution as shown in FIG. 12.

The shape of the refractive index distribution varies depending on various factors such as the composition of the glass rod 1, the temperature and time of the ion exchange and impurities in the molten salt 2, and the optical performances of the rod lenses produced under the respective conditions vary remarkably.

For this reason, in order to obtain a lens having good optical performances, the above factors are variously changed to find out optimum conditions. In practice, however, a lens having a large refractive index factor (hereinafter called "g") is caused to have also a large aberration or alternatively a lens having a small aberration is caused to have a small g thus, it has been very difficult to have an ideal rod lens which has almost no aberration but has a large g.

Further, in the case where a glass rod containing, e.g., lithium+ is subjected to ion exchange in molten sodium nitrate for preparation of a rod lens according to the ion exchange process, there arises a problem that the peripheral portion of a lens is caused to have a large thermal expansion coefficient as shown in FIG. 13. A rod having such a distribution of thermal expansion coefficient is liable to be fragile in response to a stress, so that generation of cracks or breakage frequently occurs during the use thereof.

SUMMARY OF THE INVENTION

An object of the invention is to provide a gradient index-type optical device having a large g and a small aberration in combination.

Another object of the invention is to provide a gradient index-type optical device which has eliminated the problem of fragility arising from a difference in thermal expansion coefficient between the core and the peripheral portion of the optical device.

A still further project of the invention is to provide a process for producing a gradient index-type optical device.

According to the present invention there is provided a gradient index-type optical device produced by the ion exchange process, comprising: a transparent dielectric body having a refractive index distribution, and a refractive index distribution-adjusting portion disposed on at least a part of the transparent dielectric body.

According to another aspect of the invention there is provided a process for producing a gradient index-type optical device according to the ion exchange process, which comprises: providing a transparent dielectric body containing an exchangeable ion with a refractive index distribution-adjusting portion containing an exchangeable ion, and causing the transparent dielectric body to be soaked in or to contact a molten salt containing an ion providing a refractive index distribution, thereby to effect ion exchange.

The function of the refractive index (distribution)-adjusting portion will now be described.

Generally speaking, factors relating to this refractive index distribution of a gradient index type optical device produced by the ion exchange process may include ion exchange temperature and time, composition of a transparent dielectric body such as glass, kinds of ion to be diffused, and composition of molten salt. More specifically if preparation of rod lens by the ordinary ion exchange process is taken as an example, the refractive index distribution is automatically determined by the process time, if the composition of the glass rod and molten salt are determined and the ion exchange temperature is fixed. This is because the glass structure is determined by the glass composition, and the diffusion speed of ion forming a refractive index distribution passing through the structure is automatically determined. Thus, the function of the refractive index-adjusting portion of the present invention is to provide a glass having a different composition at at least a part of the glass rod, to provide the portion with a different ion diffusion speed from that in the glass rod, and to delicately change the shape of the refractive index distribution in the glass rod. In this way, by melt-integrating the refractive index-adjusting portion containing an exchangeable ion and the transparent dielectric body, and effecting ion exchange through the refractive index-adjusting portion, various gradient index-type optical devices having excellent optical performances and large mechanical strength can be obtained easily.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 11 is an illustration of an ion exchange treatment; and

FIGS. 12 and 13 are graphs showing the refractive index distribution and thermal expansion coefficient distribution of an ion exchanged glass rod.

DESCRIPTION OF THE PREFERRED EMBODIMENTS

The transparent dielectric body used in the present invention comprises a transparent dielectric material containing an ion to be ion-exchanged, i.e., an (ion)-exchangeable ion. Examples of the material thereof may include optical glass and crystals, such as $LiNbO_3$ and $LiTaO_5$, and various kinds of glass may generally be used suitably. The refractive index-adjusting portion intimately formed on the transparent dielectric body also contains an exchangeable ion, and the ion exchange reaction is effected through the portion to provide the transparent dielectric body with a refractive index distribution. The exchangeable ion may preferably be a cation, such as $Li^+$, $Na^+$, $K^+$, $Rb^+$, $Cs^+$, $Tl^+$ or $Ag^+$. The molten salt also contains an exchangeable ion which is different from the exchangeable ion in the transparent dielectric body but may preferably be selected from the same group of cations as described above. The exchangeable ion in the molten salt may particularly preferably be sodium or potassium.

The exchangeable ion contained in the refractive index-adjusting portion and the exchangeable ion in the transparent dielectric body may be either the same or different. In case where the same ion is contained in the same amount in the refractive index-adjusting portion and the transparent dielectric body, a suitable result may be obtained by appropriately adjusting the amount of another ion in these portions.

Further, the gradient index-type optical device according to the present invention may preferably have an optical characteristic in terms of maximum curvature of field of 0.1 mm or less, particularly 0.05 mm or less, at the maximum value of g. Further, the refractive index-adjusting portion constituting the gradient index-type optical device may preferably have a thickness of 1/5-1/200, particularly 1/10-1/5, of the thickness of the transparent dielectric body.

Figure 1:
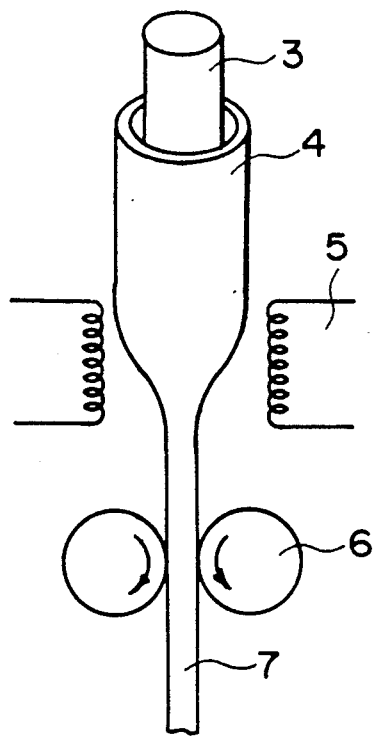
FIG. 1 is a schematic view illustrating a heat stretching step in Example 1.
Figure 3:
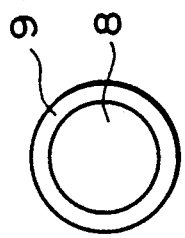
FIG. 3 is a sectional view of a double rod lens according to Example 1.

Hereinbelow, the present invention will be explained with reference to the drawings. FIGS. 1 and 3 illustrate an embodiment of the invention. More specifically, FIG. 3 shows a rod lens having a refractive index-adjusting portion and FIG. 1 illustrates an embodiment of the process for producing the lens.

Referring to FIG. 1, a cylindrical refractive index-adjusting glass 4 containing an exchangeable ion is disposed to encircle a rod core glass 3 and both are heated by an electric furnace 5 and drawn by pulling rollers 6 to provide a double glass rod 7 through melt integration of the core glass 3 and the refractive index-adjusting glass 4. The double glass rod is cut into an appropriate length and then soaked in a molten salt containing an exchangeable ion thereby to effect ion exchange between the exchangeable ion in the molten salt. The double rod after the ion exchange is formed into a rod lens comprising a transparent core 8 and a refractive index-adjusting layer 9 surrounding the core 8 as shown in FIG. 3.

Figure 5:
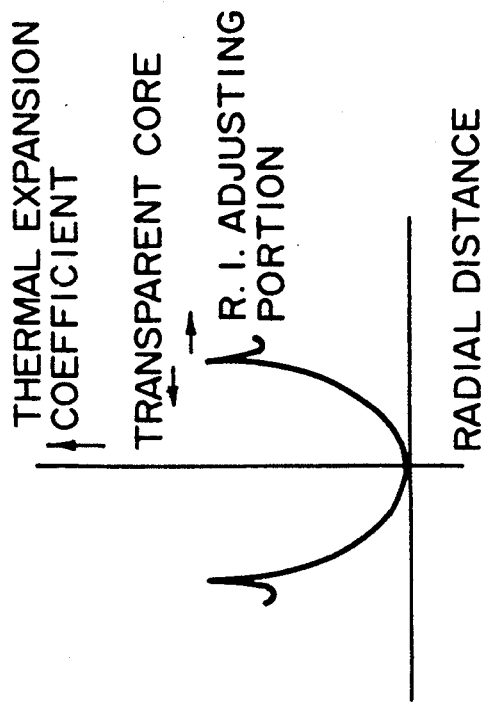
FIG. 5 is a graph showing the thermal expansion coefficient distribution of the rod lens according to Example 1.
Figure 4:
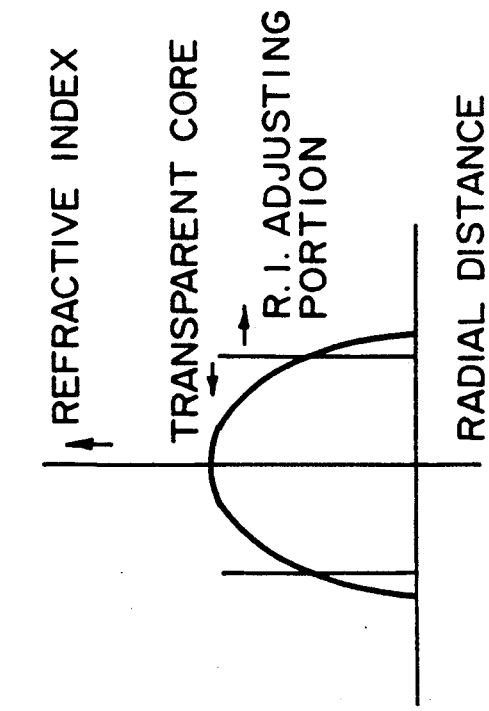
FIG. 4 is a graph showing the refractive index distribution of the rod lens of Example 1.

The gradient index-type rod lens produced according to the process of the present invention through melt-integration of a transparent dielectric body and a refractive index-adjusting member is caused to have a refractive index distribution as shown in FIG. 4 and a distribution of thermal expansion coefficient as shown in FIG. 5.

In this instance, it is possible to obtain a rod lens having a refractive index distribution as shown in FIG. 4 wherein the refractive index decreases substantially continuously from the center of the transparent core toward the circumference and provides substantially the same value (e.g., a refractive index difference of 0.001 or less) at the boundary between the transparent core and the refractive index-adjusting portion by controlling the amounts of the exchangeable ions in the transparent dielectric body and the refractive index-adjusting portion. Further, with respect to the thermal expansion coefficient of the gradient index-type optical device after the ion exchange treatment, the increase in the thermal expansion coefficient in the transparent dielectric body toward the surface of the gradient index-type optical device ceased and the thermal expansion coefficient may even be caused to decrease at the boundary of the transparent dielectric body and the refractive index-adjusting portion. Accordingly, the mechanical strength is also improved. For example, if a rod lens shown in FIG. 3 is caused to have a thermal expansion coefficient in its peripheral refractive index-adjusting portion which is smaller than the thermal expansion coefficient at the boundary between the transparent core and the refractive index-adjusting portion as shown in FIG. 5, the rod lens is provided with an improved mechanical strength. The rod lens having such distributions of refractive index and thermal expansion coefficient are much better in optical characteristic and mechanical strength than the conventional rod lens.

Thus, by variously changing the kind and amount of the exchangeable ion in the refractive index-adjusting glass, it becomes possible to significantly change the diffusing speed of exchangeable ions between the core and refractive index-adjusting glasses, whereby it becomes possible to easily obtain a lens having a large g value and also a small aberration.

Further, it is possible to provide a lens having also an improved mechanical strength by causing a compression stress in the peripheral portion of the rod at the boundary between the refractive index-adjusting portion and the core portion of the resultant rod lens shown in FIG. 5.

Further, the rod lens is easily provided with a good accuracy of the outer diameter because a constant accuracy is kept in the step of melt-integration of the core glass and the refractive index-adjusting glass according to the present invention.

Figure 2:
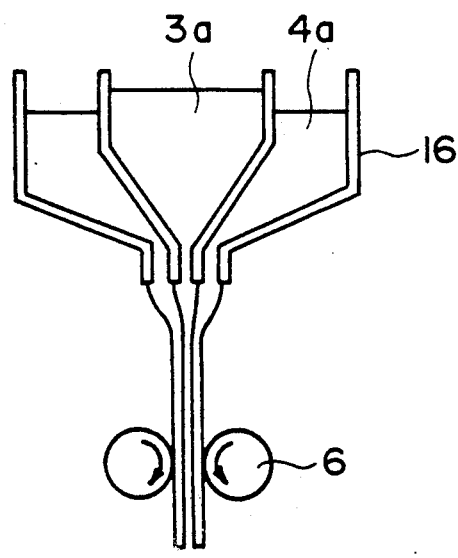
FIG. 2 is a sectional view of a double-walled crucible according to a modification of Example 1.

The melt integration of a transparent dielectric body and a refractive index-adjusting portion can also be effected in a manner as shown in FIG. 2 wherein the respective materials are heat-melted in a double-walled crucible 16 so that a transparent dielectric material 3a is melted in an inner crucible, a refractive index-adjusting material 4a containing an exchangeable ion is melted in an outer crucible, and both materials are respectively withdrawn through lower nozzles and pulling rollers 6 to produce a melt-integrated structure of both materials.

Figure 7:
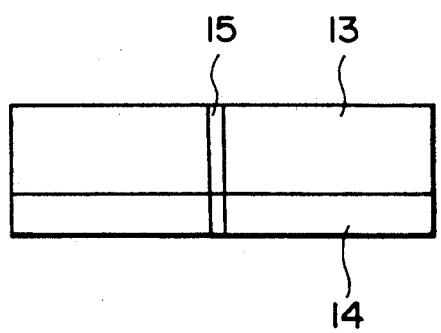
FIG. 7 is a sectional view showing the axial lens produced by Example 2.

Further, if the thermal stress occurring due to the ion exchange is not too large, the refractive index-adjusting portion according to the process of the present invention can be removed by grinding or etching after the completion of the ion exchange to provide a high performance rod lens having an ordinary shape without a clad portion. FIG. 7 shows a gradient index-type lens having a flat plate-shaped refractive index-adjusting portion according to the present invention.

Hereinbelow, the present invention will be described more specifically based on examples.

EXAMPLE 1

As shown in FIG. 1, a 30 mm-dia. core glass 3 of a borosilicate glass containing 15 mol. % of $Li_2O$ was provided. Around the core glass 3 was disposed a hollow cylindrical refractive index-adjusting glass 4 of a borosilicate glass containing 15 mol. % of $Li_2O$ and 5 mol. % of $ZrO_2$ and having a thickness of 1.0 mm. The core glass 3 and the refractive index-adjusting glass 4 were fixed relative to each other, heated to 680° C. in an electric furnace 5 and stretched through pulling roller 6 to provide a double glass rod 7 of 1.2 mm in diameter having the core glass and the refractive index-adjusting glass melt-integrated with each other.

Figure 9:
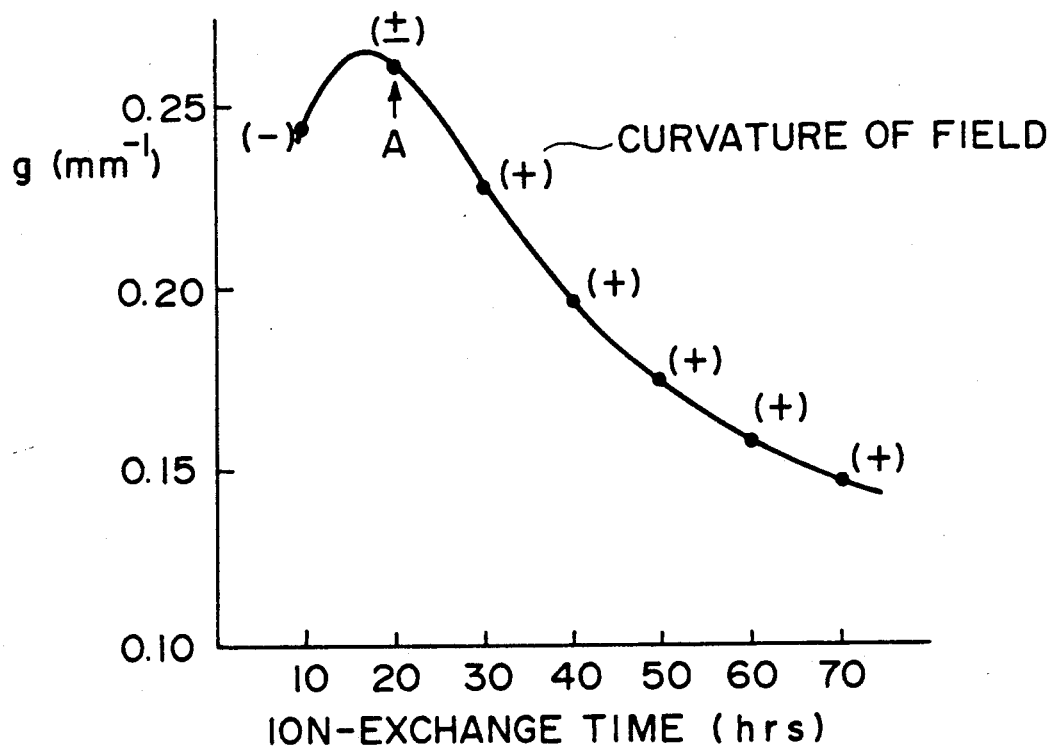
FIGS. 9 and 10 are graphs showing the changes in g value and curvature of field depending on the ion exchange time of the two kinds of rod lenses according to Example 1.
Figure 10:
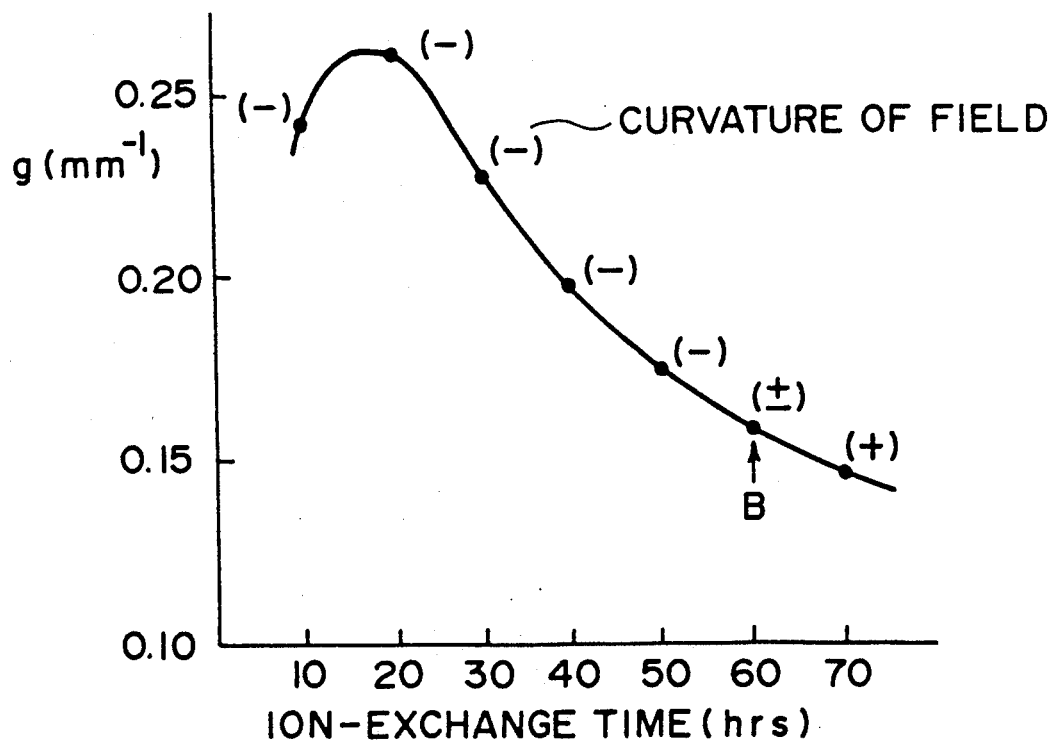

Separately, a glass rod having a diameter of 32 mm and the same composition as the above core glass was similarly heated in the electric furnance and stretched to obtain an ordinary non-clad glass rod having a diameter of 1.2 mm. The clad glass rod and non-clad glass rod were respectively cut into a length of 1 mm, and 7 bars each of the above sample rods were soaked in molten bath of sodium nitrate held at 500° C. to effect ion exchange between $Li^+$ ion in the glass rod and $Na^+$ ion in the molten salt. At 10 hours interval after the commencement of the ion exchange, sampling was performed, and the total of 14 samples including samples soaked for 70 hours at the longest were collected. The g value and curvature of field were measured with respect to the respective samples. FIG. 9 shows the results obtained with respect to the lenses having a clad portion of refractive index-adjusting glass, and FIG. 10 shows the result obtained by the ordinary non-clad lenses.

The non-clad lenses having no refractive index-adjusting portion gave a maximum g value around 20 hours but the curvature of field obtained at that time was considerably deviated to a negative side, and around 60 hours giving no curvature, the g-value was lowered to about 0.16.

On the other hand, the clad-lenses having a refractive index-adjusting portion according to the present invention gave substantially no curvature of field around 20 hours, and the g value at that time was as high as 0.26, whereby a high performance rod lens was obtained. This is presumably because the refractive index-adjusting clad portion suppressed the excessive exchange of Li ions from the vicinity of the surface of the core glass, and the refractive index distribution in the thickness direction of the optical device was caused to approach an ideal one. Further, it is considered that the Li ions in the clad glass portion had a lower degree of ion exchangeability than the Li ions in the core glass.

Further, in the rod lens, the refractive index-adjusting glass had a smaller thermal expansion coefficient than the core glass, so that the resultant rod lens had an improved mechanical strength because of a caulking action.

EXAMPLE 2

Figure 6:
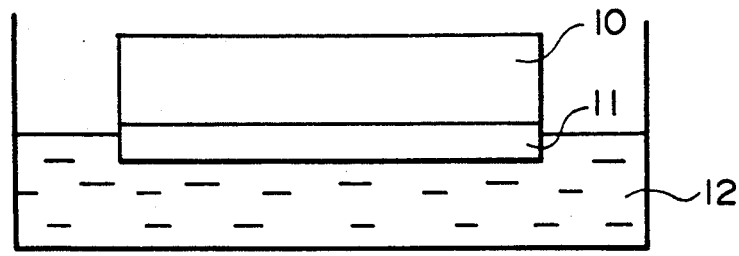
FIG. 6 is a sectional view showing a process for producing an axial lens according to Example 2.

As shown in FIG. 6, a flat plate-transparent glass 10 having the same composition as the core glass in Example 1 and a flat plate-refractive index-adjusting adjusting glass 11 having the same composition as in Example 1 were melt-integrated, and then ion-exchange was effected through the refractive index-adjusting glass 11 in a molten salt of $NaNO_3$ 12. Simultaneously, a flat plate glass 10 alone was subjected to ion exchange under the same conditions.

Figure 8:
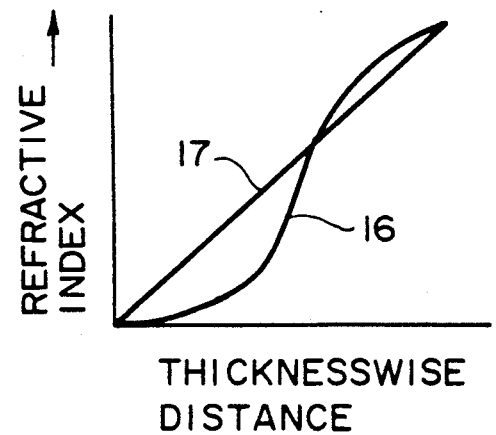
FIG. 8 is a graph showing the refractive index distribution of the axial lens according to Example 2 in the thickness direction.

From the axial lenses obtained after the ion exchange, a glass piece 15 for measurement was cut out as shown in FIG. 7 and both faces of the glass piece were ground followed by measurement of the refractive index distribution. The results thus obtained are shown in FIG. 8. The case of the flat plate glass alone provided a refractive index distribution 16 forming a higher order curve having a point of inflection. On the other hand, the case where the refractive index-adjusting portion was provided gave a substantially linear distribution 17, thus providing a suitable axial lens from the view point of lens designing.

EXAMPLE 3

A 1.2 mm-dia. double glass rod was prepared in the same manner as in Example 1 except that a 30 mm-dia. cylindrical borosilicate glass containing 20 mol. % of $Li_2O$ was used as the core glass shown in FIG. 1, and a 1.0 mm-thick annular borosilicate glass containing 20 mol. % of $Li_2O$ and 2 mol. % of $Al_2O_3$ was used as the refractive index-adjusting glass.

Separately, for the purpose of comparison, a 1.2 mm-dia. ordinary non-clad glass rod was prepared in the same manner as in Example 1 except for using a glass rod having the same composition as the above core glass.

The above clad glass rod and non-clad glass rod were respectively cut into a length of 1 mm, and 20 samples each of the rods were soaked in a molten salt of potassium nitrate held at a temperature of 510° C. to effect exchange of Li ion in the glass rod and K ion in the molten salt. Sampling was performed at 100 hours interval after the commencement of ion exchange, and the total of 20 sample including those soaked for 2000 hours at the longest were subjected to measurement of g value and curvature of field. The ion exchange time giving a curvature of field of substantially zero was 1100 hours for the non-clad lenses having no refractive index-adjusting portion, and the g value at that time was 0.19. On the other hand, the clad lenses having a refractive index-adjusting portion gave a curvature of field of substantially zero around 400 hours, and the g value at that time was 0.33.

Then, 100 samples each of the above clad glass rod and the non-clad glass rod respectively in a length of 1 meter were soaked in the above-mentioned molten salt of potassium nitrate held at 510° C. and pulled up at 100 hours and 1100 hours, respectively, giving a curvature of field of zero. The g values of 20 samples each of the resultant lenses were measured and confirmed to be in a range of ±2% of 0.33 and 0.19, respectively. Further, when all of the 100 samples each of the lenses were examined with respect to their shape, breakage or fracture was observed with respect 82 samples among 100 samples of the non-clad lens having no refractive index-adjusting portion, while the clad lenses having a refractive index-adjusting portion showed no breakage or fracture with respect to all of the 100 samples.

The large difference in occurrence of fracture or breakage may be considered as follows. The exchange of Li ion and K ion causes an increase in thermal expansion coefficient from the center of the rod toward the surface, so that the fracture or breakage is liable to occur during cooling after the ion exchange. This phenomenon is suppressed by a caulking effect in the course of cooling for a clad lens having a refractive index-adjusting portion having a smaller expansion coefficient than the core glass.

EXAMPLE 4

A 1.5 mm-dia. double glass rod was prepared in the same manner as in Example 1 except that a 40 mm-dia. cylindrical borosilicate glass containing 15 mol. % of $Li_2O$ was used as the core glass shown in FIG. 1, and a 1.0 mm-thick annular borosilicate glass containing 15 mol. % of $Na_2O$ and 4 mol. % of $Al_2O_3$ was used as the refractive index-adjusting glass.

Separately, for the purpose of comparison, a 1.5 mm-dia. ordinary non-clad glass rod was prepared in the same manner as in Example 1 except for using a glass rod having the same composition as the above core glass.

The above clad glass rod and non-clad glass rod were respectively cut into a length of 1 mm and 20 samples each of the rods were soaked in a molten salt of sodium nitrate held at a temperature of 500° C. to effect exchange of Li ion in the glass rod and Na ion in the molten salt. Sampling was performed at 10 hours interval after the commencement of ion exchange and the total of 40 sample including those soaked for 200 hours at the longest were subjected to measurement of g value and curvature of field. The ion exchange time giving a curvature of field of substantially zero was 100 hours for the non-clad lenses having no refractive index-adjusting portion, and the g value at that time was 0.13. On the other hand, the clad lenses having a refractive index-adjusting portion gave a curvature of field of substantially zero around 40 hours, and the g value at that time was 0.27.

EXAMPLE 5

A 1.2 mm-dia. double glass rod was prepared in the same manner as in Example 1 except that a 60 mm-dia. cylindrical borosilicate glass containing 15 mol. % of $Li_2O$ was used as the core glass shown in FIG. 1, and a 1.0 mm-thick annular borosilicate glass containing 20 mol. % of $K_2O$ and 3 mol. % of $Al_2O_3$ was used as the refractive index-adjusting glass.

Separately, for the purpose of comparison, a 1.2 mm-dia. ordinary non-clad glass rod was prepared in the same manner as in Example 1 except for using a glass rod having the same composition as the above core glass.

The above clad glass rod and non-clad glass rod were respectively cut into a length of 1 mm and 15 samples each of the rods were soaked in a molten salt of potassium nitrate held at a temperature of 510° C. to effect exchange of Li ion in the glass rod and K ion in the molten salt. Sampling was performed at 100 hours interval after the commencement of ion exchange and the total of 30 sample including those soaked for 1500 hours at the longest were subjected to measurement of g value and curvature of field. The ion exchange time giving a curvature of field of substantially zero was 1000 hours for the non-clad lenses having no refractive index-adjusting portion, and the g value at that time was 0.18. On the other hand, the clad lenses having a refractive index-adjusting portion gave a curvature of field of substantially zero around 500 hours, and the g value at that time was 0.3.

EXAMPLE 6

A 1.15 mm-dia. double glass rod was prepared in the same manner as in Example 1 except that a 44 mm-dia. cylindrical borosilicate glass containing 15 mol. % of $Li_2O$ was used as the core glass shown in FIG. 1, and a 1.0 mm-thick annular borosilicate glass containing 15 mol. % of $Li_2O$ and 5 mol. % of $ZrO_2$ was used as the refractive index-adjusting glass.

Separately, for the purpose of comparison, a 1.1 mm-dia. ordinary non-clad glass rod was prepared in the same manner as in Example 1 except for using a glass rod having the same composition as the above core glass.

The above clad glass rod and non-clad glass rod were respectively cut into a length of 1 mm, and 20 samples each of the rods were soaked in a molten salt of sodium nitrate held at a temperature of 500° C. to effect exchange of Li ion in the glass rod and Na ion in the molten salt. Sampling was performed at 5 hours interval after the commencement of ion exchange and the total of 40 samples including those soaked for 2000 hours at the longest were subjected to measurement of g value and curvature of field. The ion exchange time giving a curvature of field of substantially zero was 55 hours for the non-clad lenses having no refractive index-adjusting portion, and the g value at that time was 0.15. On the other hand, the clad lenses having a refractive index-adjusting portion gave a curvature of field of substantially zero around 20 hours, and the g value at that time was 0.24.

Then, 50 samples each of the above clad glass rod and the non-clad lens respectively in a length of 1 meter were soaked in the above-mentioned molten salt of sodium nitrate held at 500° C. and pulled up at 20 hours and 55 hours, respectively, giving a curvature of field of zero. The g values of 20 samples each of the resultant lenses were measured and confirmed to be in a range of ±2% of the above-mentioned 0.24 and 0.15, respectively.

Then, the remaining 30 samples of the clad lens were washed with water for 30 minutes to remove the molten salt residue and etched in a 20 wt. % aqueous solution of hydrogen fluoride for 25 minutes at room temperature to remove the clad glass portion, whereby a 1.1 mm-dia. lens was obtained.

Then, the peripheries of the etched clad lens (A) and the non-clad rod lens (B) were respectively coated with a light-absorptive paint and bundled to provide lens arrays each having two rows of lenses for providing an image of unit magnification.

The MFT values of the lens arrays were 85% for the one formed by the lens (A) and 60% for the one formed by the lens (B). Further, the lens array prepared by using the lens (A) showed a large aperture and gave a shorter length required for providing an image of unit magnification (conjugate length) than the one formed by the lens (B).

What is claimed is:

1. A gradient index-type optical device produced by an ion exchange process, using an external exchanging ion source containing an exchanging ion, said device comprising:
- a transparent dielectric body comprising an exchangeable ion and said exchanging ion from said external exchanging ion source and having a varying refractive index distribution, and
- a refractive index distribution-adjusting portion disposed on at least a part of the transparent dielectric body and comprising said exchanging ion, wherein said transparent dielectric body and said refractive index distribution-adjusting portion have different ion diffusion speeds; and said refractive index distribution is formed by ion exchange between said transparent dielectric body and said external ion source through said refractive index distribution-adjusting portion.

2. An optical device according to claim 1, wherein said transparent dielectric body has a thermal expansion coefficient increasing in a direction toward the surface of the gradient index-type optical device, said thermal expansion coefficient ceases to increase or decreases at the boundary of the transparent dielectric body and the refractive index distribution-adjusting portion.

3. An optical device according to claim 1, wherein said exchangeable ion and said exchanging ion are respectively at least one cation selected from the group consisting of $Li^+$, $Na^+$, $K^+$, $Rb^+$, $C_s^+$, $Tl^+$ and $Ag^+$; wherein the exchanging ion and the exchangeable ion selected are different from each other.

4. An optical device according to claim 1, 2 or 3, wherein said refractive index distribution-adjusting portion further comprises an exchangeable ion which is the same as the exchangeable ion in said transparent dielectric body.

5. An optical device according to claim 1, 2 or 3 wherein said refractive index distribution-adjusting portion further comprises an exchangeable ion which is different from the exchangeable ion in said transparent dielectric body.

* * * * *

UNITED STATES PATENT AND TRADEMARK OFFICE
CERTIFICATE OF CORRECTION

PATENT NO.   :   5,032,000
DATED        :   July 16, 1991
INVENTOR(S)  :   SEIICHI SHINGAKI It is certified that error appears in the above-identified patent and that said Letters Patent is hereby corrected as shown below:

Column 1
   Line 23, "exchange" should read --exchanged--.

Column 2
   Line 32, "at" (first occurrence) should read --within--.

Column 3
   Line 64, "the molten" should read --the double glass rod and the exchangeable ion in the molten--.

Column 10
   Line 7, "$C_s+$" should read --Cs+,--.

Signed and Sealed this

Second Day of February, 1993

Attest:

STEPHEN G. KUNIN

*Attesting Officer*       Acting Commissioner of Patents and Trademarks